(12) United States Patent
Wing et al.

(10) Patent No.: US 8,533,339 B2
(45) Date of Patent: Sep. 10, 2013

(54) DISCOVERING SECURITY DEVICES LOCATED ON A CALL PATH AND EXTENDING BINDINGS AT THOSE DISCOVERED SECURITY DEVICES

(75) Inventors: Daniel G. Wing, San Jose, CA (US); Cullen Jennings, Santa Cruz, CA (US); Jonathan D. Rosenberg, Freehold, NJ (US)

(73) Assignee: Cisco Technology, Inc., San Jose, CA (US)

( * ) Notice: Subject to any disclaimer, the term of this patent is extended or adjusted under 35 U.S.C. 154(b) by 1363 days.

(21) Appl. No.: 11/549,452

(22) Filed: Oct. 13, 2006

(65) Prior Publication Data

US 2008/0148378 A1 Jun. 19, 2008

(51) Int. Cl.
*G06F 15/16* (2006.01)
*G06F 15/173* (2006.01)
*H04L 12/28* (2006.01)

(52) U.S. Cl.
USPC ........... 709/227; 709/225; 709/226; 370/352; 370/392; 370/401

(58) Field of Classification Search
USPC ................. 709/225, 226, 227; 370/352, 392, 370/401
See application file for complete search history.

(56) References Cited

U.S. PATENT DOCUMENTS

| 7,302,496 | B1* | 11/2007 | Metzger ................... 709/245 |
| 2004/0024882 | A1 | 2/2004 | Austin et al. |
| 2004/0057385 | A1 | 3/2004 | Roshko |
| 2005/0105543 | A1* | 5/2005 | Ikenaga et al. ............ 370/428 |
| 2006/0075127 | A1* | 4/2006 | Juncker et al. ............ 709/229 |
| 2006/0212702 | A1 | 9/2006 | Firestone et al. |
| 2006/0215684 | A1* | 9/2006 | Capone .................... 370/437 |
| 2007/0019622 | A1* | 1/2007 | Alt et al. ................... 370/352 |

OTHER PUBLICATIONS

Rosenberg, et al., STUN, Simple Traversal of User Datagram Protocol (UDP) Through Network Address Translators (NATs), RFC 3489, Mar. 2003, pp. 1-47.
Stiemerling, et al., NAT/Firewall NSIS Signaling Layer Protocol (NSLP), draft-ietf-nsis-nslp-natfw-12.txt, Jun. 27, 2006, pp. 1-101.

* cited by examiner

*Primary Examiner* — Peter Shaw
(74) *Attorney, Agent, or Firm* — Lempia Summerfield Katz LLC

(57) ABSTRACT

In one embodiment, an endpoint elicits a pattern of STUN responses to identify security devices located on a call path. The endpoint then uses address information from the identified security devices to establish an efficient media flow with a remote endpoint. The endpoint can optimize the number of network devices and network paths that process the endpoint's keepalive message. Additionally, the endpoint may request custom inactivity timeouts with each of the identified security devices for reducing bandwidth consumed by keepalive traffic.

12 Claims, 9 Drawing Sheets

DISCOVERING SECURITY DEVICES LOCATED ON A CALL PATH AND EXTENDING BINDINGS AT THOSE DISCOVERED SECURITY DEVICES

TECHNICAL FIELD

The present disclosure relates generally to the field of networking.

BACKGROUND

Endpoints such as Internet Protocol (IP) phones can make multimedia communications such as Voice over IP (VoIP) calls over a packet switched network using multimedia session signaling protocols such as Session Initial Protocol (SIP). Security devices such as firewalls and Network Address Translators (NATs) located between two endpoints can prevent the flow of multimedia messages between the two endpoints. Simple Traversal of User Datagram Protocol (UDP) Through NATs (STUN) was developed to allow multimedia communications to operate through NATs, STUN is described in Request for Comment (RFC) 3489.

STUN is used by a calling device to determine a NAT public address and NAT port number associated with the calling device. The calling device provides the NAT public address and NAT port number to the target endpoint during a call establishment process. The use of STUN as described in RFC 3489 when more than one NAT or any amount of firewalls are interposed between a calling device and the Internet produces certain inefficiencies and problems. The disclosure that follows solves these and other problems.

DESCRIPTION OF EXAMPLE EMBODIMENTS

Overview

Figure 1:
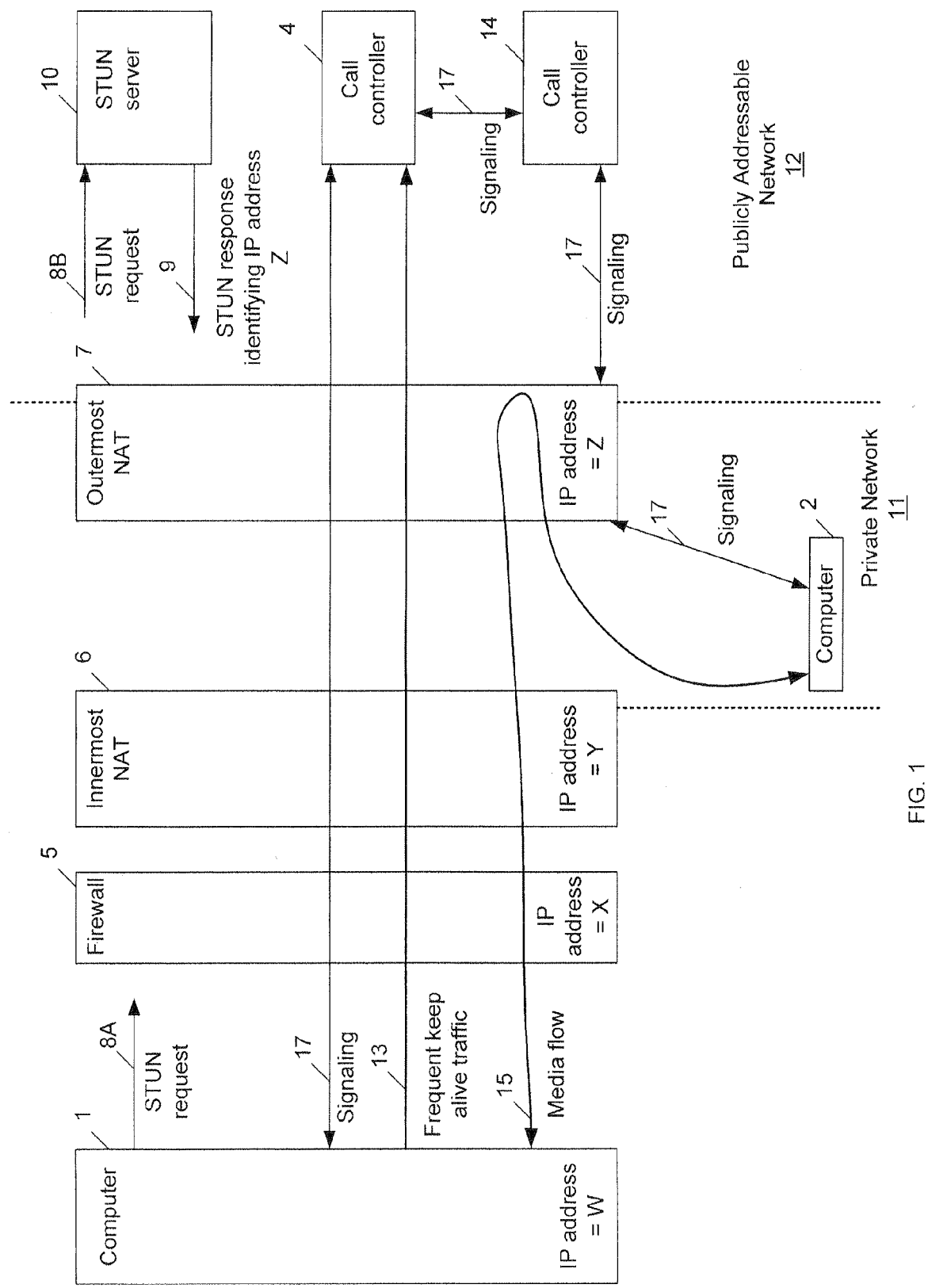
FIG. 1 illustrates Simple Traversal of User Datagram Protocol (UDP) Through Network Address Translators (NATs) (STUN) operation with NATs and firewalls according to Request For Comment (RFC) 3489.

In one embodiment, an endpoint elicits a pattern of STUN responses to identify security devices located on a call path. The endpoint then uses address information from the identified security devices to establish an efficient media flow with a remote endpoint. The endpoint can optimize the number of network devices and network paths that process the endpoint's keepalive message. Additionally, the endpoint may request custom inactivity timeouts with each of the identified security devices for reducing bandwidth consumed by keepalive traffic.

Description

Several preferred examples of the present application will now be described with reference to the accompanying drawings. Various other examples of the invention are also possible and practical. This application may be exemplified in many different forms and should not be construed as being limited to the examples set forth herein.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device.

Only those parts of the various units are shown and described which are necessary to convey an understanding of the examples to those skilled in the art. Those parts and elements not shown are conventional and known in the art.

FIG. 1 illustrates STUN operation with NATs and firewalls according to RFC 3489. Referring to FIG. 1, computer 1 has received a user request to establish multimedia communications with computer 2. As computer 1 is unaware of how many, if any, NATs are interposed between itself and the publicly addressable network 12, computer 1 needs to send, for this call and any other new calls, a STUN request 8A to public STUN server 10. As part of its basic address translation function, inner nested NAT 6 modifies the STUN request 8A by replacing the source address indicating IP address W with an IP address Y. Outer nested NAT 7 functions in a similar manner so that a STUN request 8B identifies the source as IP address Z for NAT 7.

As part of STUN operation defined by RFC 3489, STUN server 10 inserts the current source address information, such as IP address Z and a port number on NAT 7, into the payload of a STUN response 9. The STUN response 9 is then sent back to the computer 1.

The computer 1 extracts the address information and observes that the address information, address Z, is different than a local IP address W. This difference indicates the presence of only the outermost NAT 7. The firewall 5 and the NAT 6 remain undiscovered, however.

Now that its publicly-reachable address has been learned, the computer 1 continues the process of establishing a media path with computer 2 by exchanging signaling messages 17. The signaling messages 17 are exchanged using a call controller 4 for computer 1 and a call controller 14 for computer 2. After the signaling messages 17 are received by computer 2, the IP address Z and the port number are used to establish media flow 15 through NAT 7 having IP address Z.

As demonstrated by the above example, the signaling messages 17 necessitate that computer 1 and call controller 4 are constantly able to contact each other to establish the media flow 15 as well as other media flows with other endpoints. To remain contactable, computer 1 sends frequent signaling "keepalive" traffic 13 all the way to call controller 4 to keep any on path security devices, discovered or undiscovered, from timing out bindings or closing pinholes. The traffic 13 is sent according to a predetermined default, such as once every thirty seconds, to accommodate any low timeout values that could be included on undiscovered security devices (such as firewall 5 and NAT 6).

The keepalive traffic 13, as well as the per-call STUN requests, consume bandwidth on the publicly addressable network 12. When network 12 is a wireless network, the bandwidth consumed by these types of communications is particularly problematic. In such a case, each of these keepalive messages 13 and the per-call STUN request consume airtime, which is expensive.

Figure 2:
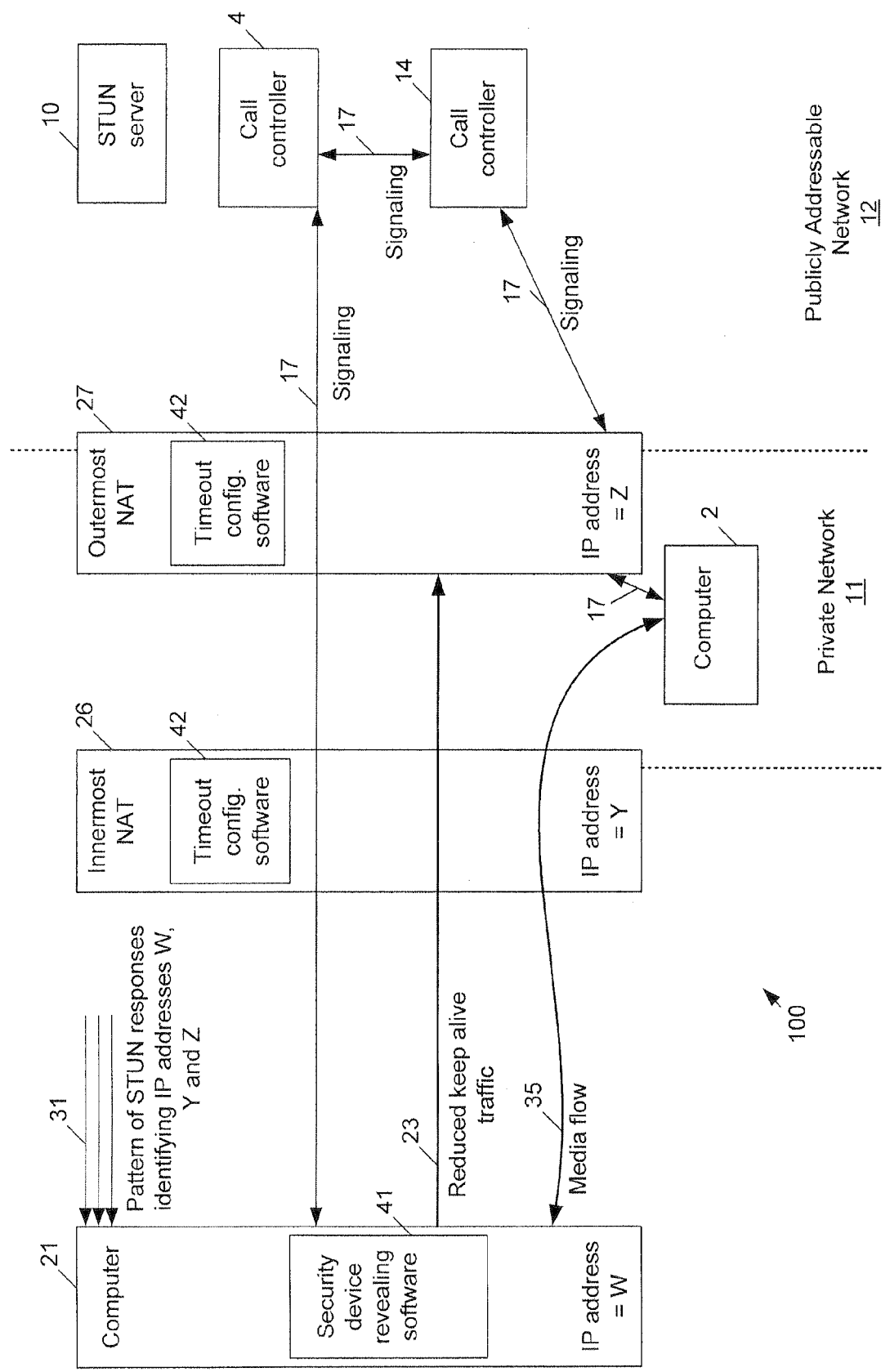
FIG. 2 illustrates an example system for finding NAT devices located on a call path and extending their bindings.

FIG. 2 illustrates an example system 100 for finding NAT devices located on a call path and extending their bindings.

Several differences are immediately apparent when comparing FIGS. 1 and 2. First, computer 21 includes security device revealing software 41 that elicits a pattern of STUN responses 31 for discovering on path security devices between computer 21 and STUN server 10, call controller 4, and remote endpoint 2, so that computer 21 can optimize the keepalive traffic with each of those connections. Second, the software 41 leverages information about the on path security devices to establish a media flow 35 that is more efficient than the media flow 15 shown in FIG. 1. Third, the NATs 26 and 27 include timeout configuration software 42 for adjusting local timeouts according to communications sent by the software 41 located on computer 21. Accordingly, extended timeout settings can be set, which allows for reduced keepalive traffic 23 as compared to the frequent keepalive traffic 13 in FIG. 1. Fourth, the keepalive traffic 23 is directed to the NAT 27 rather than call controller 4, which reduces bandwidth consumption on publicly addressable network 12.

Figure 3:
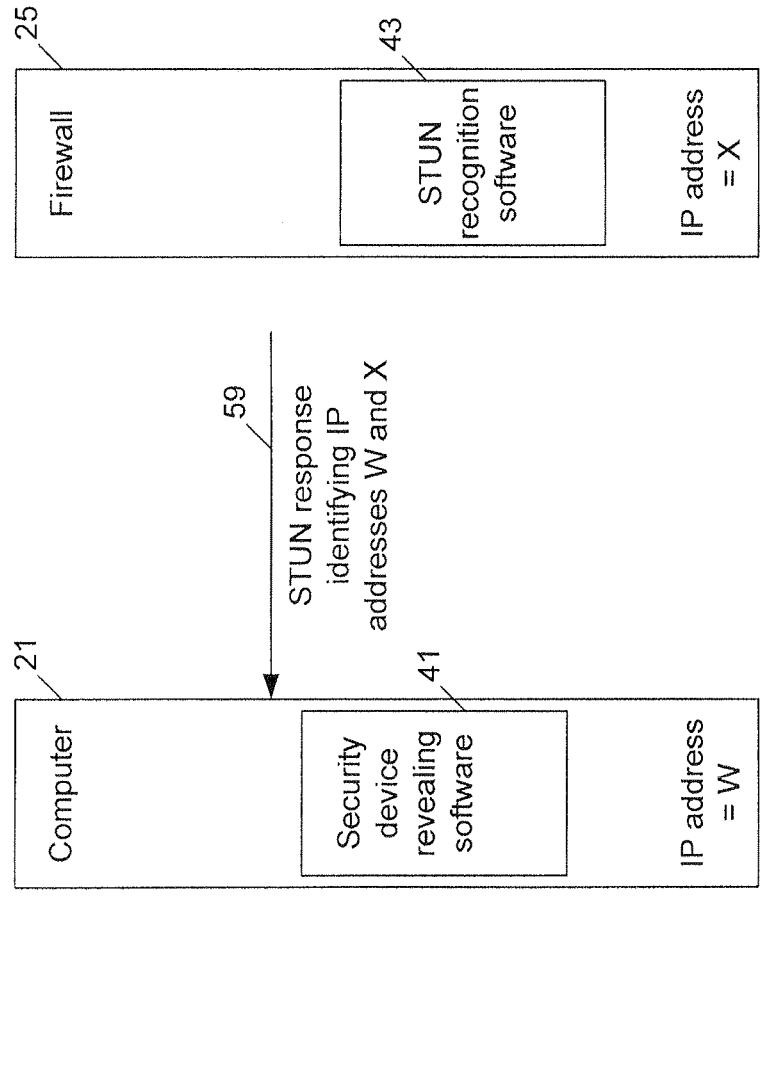
FIG. 3 illustrates an example of the computer illustrated in FIG. 2 for discovering a firewall.

FIG. 3 illustrates an example of the computer illustrated in FIG. 2 for discovering a firewall.

Other differences are immediately apparent when comparing FIGS. 1 and 3. First, the security device revealing software 41 elicits a STUN response 59 that identifies an IP address X for firewall 25. Second, the firewall 25 includes STUN recognition software 43 that both facilitates identification of the firewall 25 to computer 21 and facilitates timeout negotiation with firewall 25 for reducing keepalive traffic.

Figure 4:
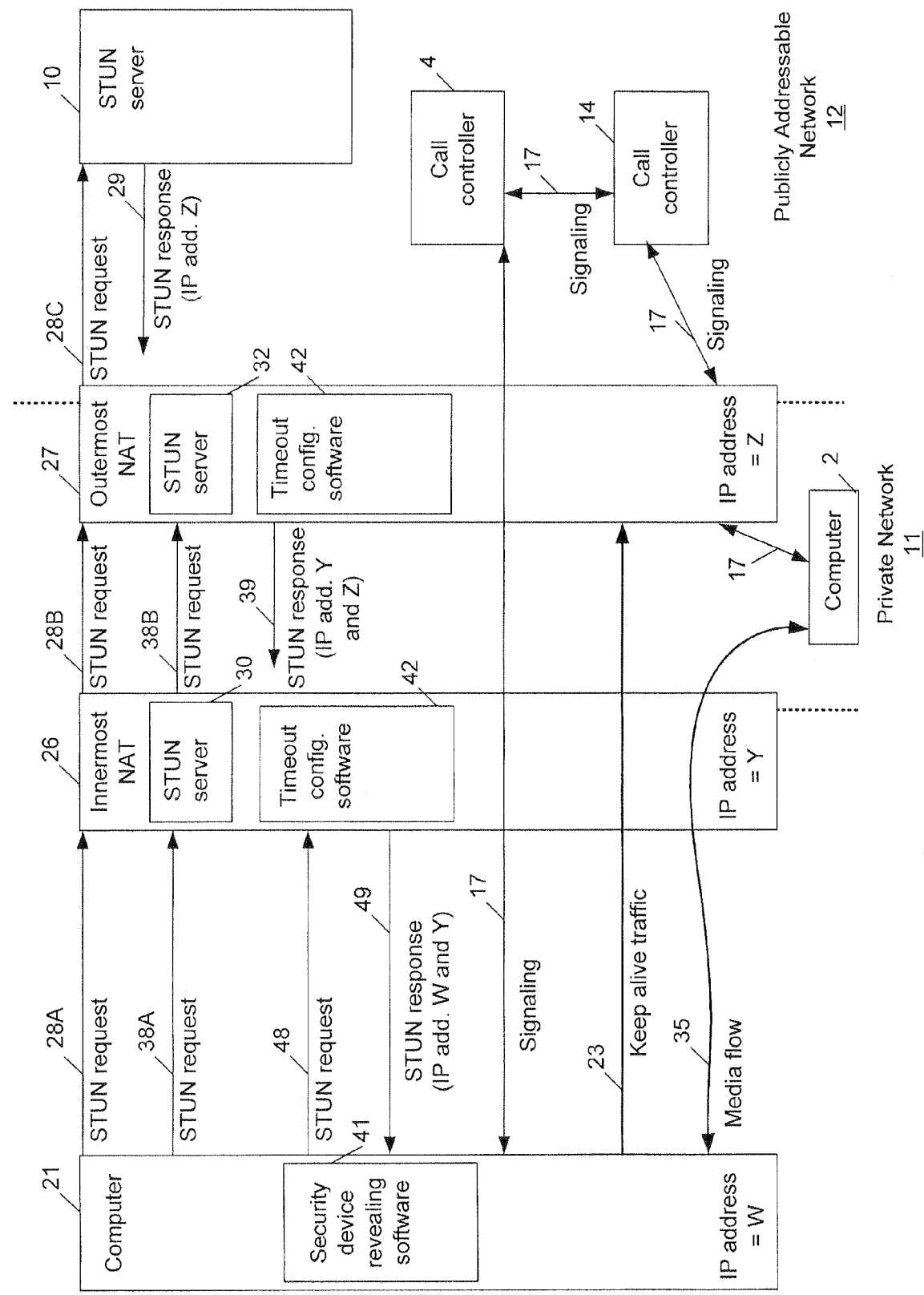
FIG. 4 illustrates an example of the computer and the NATs illustrated in FIGS. 2.

FIG. 4 illustrates an example of the computer and the NATs illustrated in FIGS. 2.

Referring to FIG. 4, to identify security devices located on a call path, computer 1 sends an initial STUN request 28A. The STUN request 28A is addressed to the default STUN port 3489 on STUN server 10. After STUN requests 28B and 28C are forwarded, STUN server 10 responds with a STUN response 29 that identifies a public IP address Z and port number for outermost NAT 27.

After receiving the STUN response 29, computer 21 compares the IP address Z included in the STUN response 29 with a local IP address W. The computer 21 identifies NAT 27 according to the comparison.

In response to the computer 21 identifying the NAT 27, even though the computer 21 may not have determined whether the NAT 27 locally includes a STUN server, the software 41 sends a STUN request 38A to STUN port number 3489 on IP address Z. STUN port number 3489 is a designated port number that STUN servers, such as STUN servers 10, 30 and 32, use for STUN communications. In other words, the STUN request 38A is sent to an undiscovered STUN server using the same STUN port that was used to send STUN request 28A. In other embodiments, the STUN request 38A may be addressed to any other port number associated with STUN communications. NAT 26 receives the STUN request 38A and communicates STUN request 38B to NAT 27.

Figure 5:
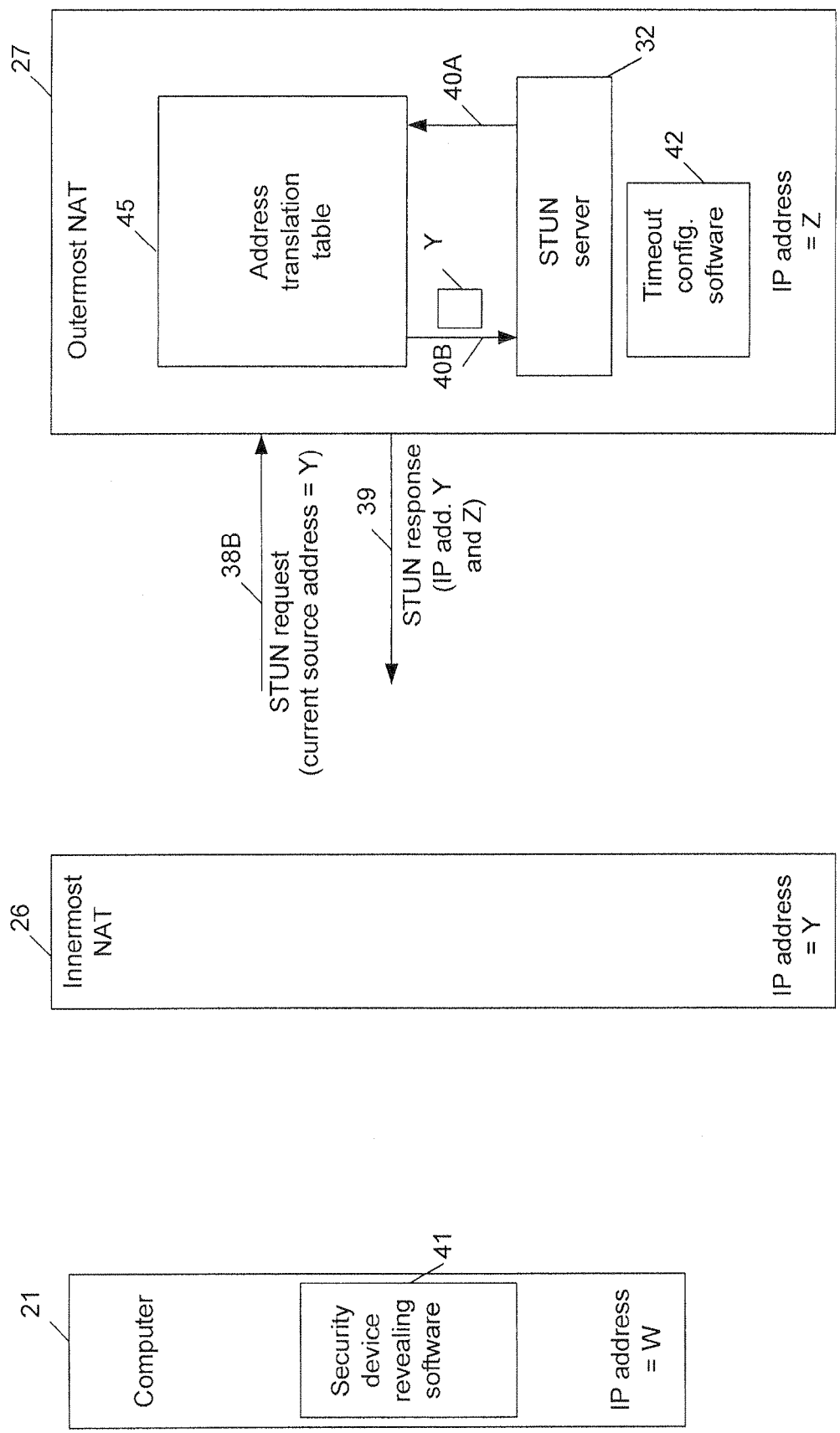
FIG. 5 illustrates an example of the STUN server from FIG. 4 providing an internally reachable address.

Next, the STUN request 38B is received at NAT 27, which is illustrated in greater detail in FIG. 5. The NAT 27 processes the received STUN request 38B using the address translation table 45 or any other binding data structure so that the STUN request 38B is received at the STUN server 32.

According to software 42, the STUN server 32 sends a request 40A for an internally reachable address for the source address included on the STUN request 38B when received by NAT 27. The NAT 27 accesses the address translation table 45 or other binding data structure to identify an internally reachable address Y, belonging to NAT 26. A response 40B that includes the internally reachable address Y is sent back to the STUN server 32.

Next, the STUN server 32 generates a STUN response 39 that identifies IP address Z because the address translation function of NAT 27 operated before the STUN server 32 processed the request. Additionally, according to software 42, the STUN server 32 includes the internally reachable address Y within the STUN response 39. The STUN response 39 is then sent back to computer 21.

Referring back to FIG. 4, computer 21 compares the IP address Y identified in the STUN response 39 to the local IP address W and accordingly identifies NAT 26. In response to the computer 21 not receiving the local address W, the software 41 continues the pattern by sending another STUN request to the newly identified address Y. This pattern of sending a new STUN request to any newly identified addresses continues until the software 41 receives a STUN response including the local IP address W. In other words, the computer 21 "walks backwards" through the NATs until every NAT located between itself and the publicly addressable network 12 has been identified. Therefore, to complete the example, computer 21 sends a STUN request 48 to STUN port number 3489 on STUN server 30 to elicit STUN response 49 including binding information identifying IP address W and IP address Y. The receipt of the STUN response 49 identifying IP address W signals computer 21 that all NATs have been discovered.

The software 41 can leverage the binding information for each NAT to establish an efficient media flow 35 with an endpoint, such as computer 2, located behind one or more of the same NATs as computer 1. In other words, computer 21 provides the discovered IP address Y as a reachable address to computer 2. Computer 2 directs multimedia communications at IP address Y. This multimedia packet flow avoids NAT 27, which is an improvement over the flow shown in FIG. 1.

Software 41 may also leverage the binding information for each NAT to establish longer bindings, which can reduce the frequency required for keepalive traffic. For example, STUN request 38A may include an attribute requesting a custom timeout value for NAT 27. Likewise, STUN request 48 may include an attribute requesting the same or a different custom timeout value for NAT 26. Accordingly, a longer lifetime can be requested for the session, e.g. five minutes, so that NATs 26 and 27 continue to accept incoming messages from computer 2 despite prolonged inactivity. Such a change can, for example, reduce keepalive messages from being sent once every thirty seconds to only once every five minutes. In other examples, timeout negotiation uses messages separate from the STUN requests 38A and 48.

Not only are bandwidth savings realized by sending less frequent keepalive traffic, but bandwidth savings are realized on the network 12 because keepalive traffic 23 does not need to be sent all the way to call controller 4. For example, since all on path security devices have been discovered using the pattern of STUN responses, computer 21 no longer needs to send keepalive traffic 23 all the way to call controller 4. Accordingly, the keepalive traffic 23 may instead be addressed to STUN port 3489 on the public side of the outermost security device, e.g. NAT 27, which ensures that all other security devices do not timeout the session due to inactivity.

Endpoints such as computer 21 are preconfigured to access a public STUN server at a default address to determine an associated reachable address. Whenever the endpoints need to send a STUN request, for example to determine updated binding information, a STUN request is sent to this public STUN server according to these local configuration settings.

However, computer 21 discovered that NAT 27 includes a STUN server 32 due to the STUN response 39 elicited by STUN request 38A, which was address to an undiscovered STUN server. The discovery of the STUN server 32 can be leveraged to reduce traffic over the publicly accessible network 12 to the STUN server 10. For example, the discovered STUN server 32 located on NAT 27 can be used for future STUN requests instead of the STUN server 10. The software 41 reconfigures computer 21 to communicate with NAT 27 for future binding information inquires. Such reconfiguring reduces the amount of traffic over publicly addressable network 12 and reduces the amount of processing required by STUN server 10.

Figure 6:
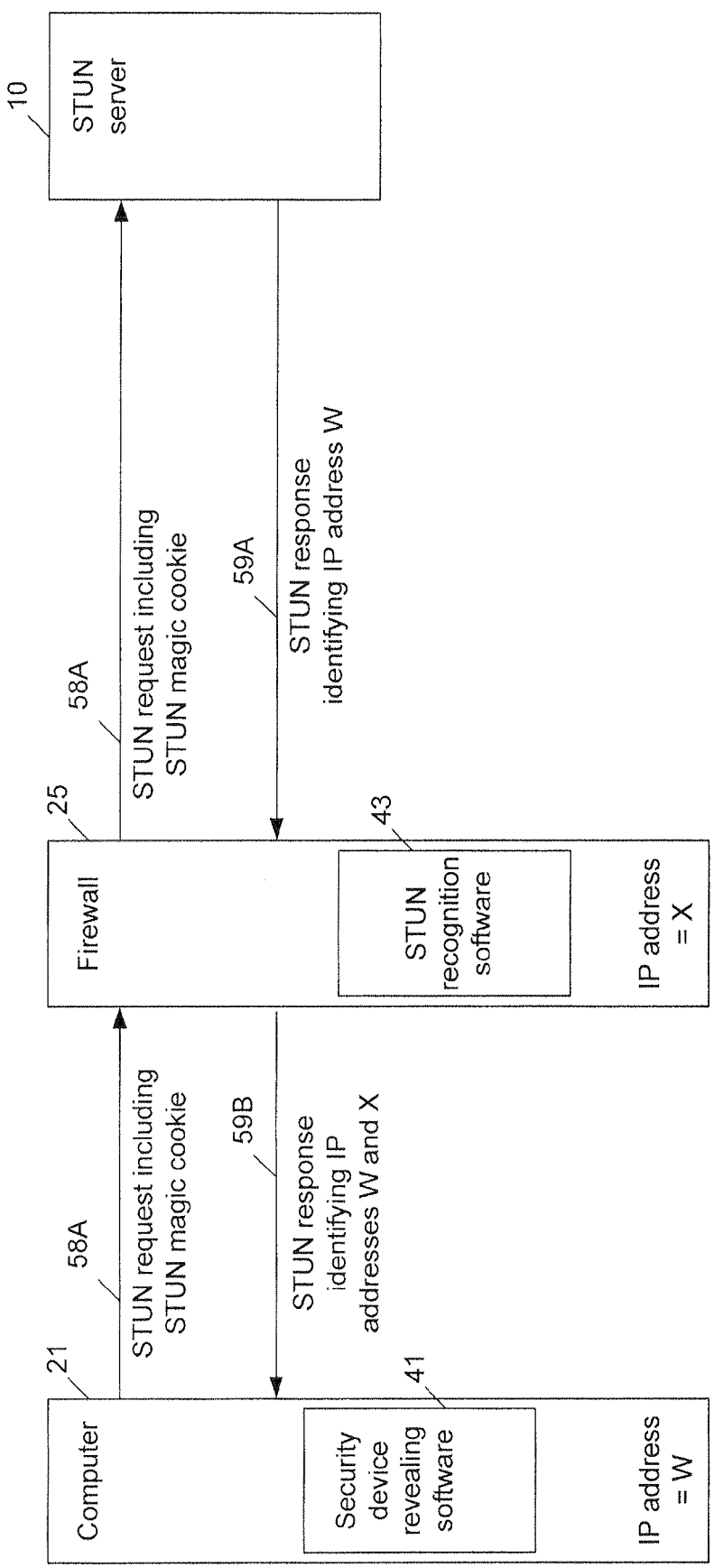
FIG. 6 illustrates an example of the firewall illustrated in FIG. 3.

FIG. 6 illustrates an example of the firewall illustrated in FIG. 3.

Computer 21 sends STUN request 58A containing a STUN magic cookie or other identifier to public STUN server 10. The STUN magic cookie is a fixed 32 bit value that identifies STUN traffic and is described in more detail in the document draft-ietf-behave-rfc-3489bis-04.txt, which is located on the Internet Engineering Task Force (IETF) website. In other examples, the STUN request 58A includes an attribute explicitly requesting any on path firewalls to include a local IP address. In yet other examples, any other method may be used by the firewall 25 to distinguish STUN requests from other traffic.

Also, the STUN request 58A may include an attribute requesting a custom timeout value. When the custom timeout is requested, the firewall 25 will set a session accordingly, otherwise, a default timeout will be used.

The firewall 25 receives an incoming message and identifies it as a STUN message by observing the STUN magic cookie. In the present example, the software 43 then stores a STUN transaction identifier included in the STUN request 58A in a local memory. Storing by the software 43 may be responsive to identifying the STUN magic cookie or by identifying the attribute explicitly requesting inclusion of a local IP address. In other examples, no STUN transaction identifiers are stored.

Next, the firewall 25 intercepts a STUN response 59A identifying IP address W. The firewall 25 compares a STUN transaction identifier included in the STUN response 59A to the value stored in memory. When there is a match, the firewall 25 attaches a local IP address X for the firewall 25 to the STUN response 59A. In the present example, the local IP address X is attached after a message integrity attribute included in the STUN response 59A to avoid interference with the STUN message integrity scheme used by computer 21. In other words, the local IP address X is added outside a digital signature for the STUN response 59A in contrast to the IP address W that is located within the digital signature. The firewall 25 then forwards STUN response 59B identifying the IP addresses W and X to computer 21.

Computer 21 receives the STUN response 59B and accesses the address information contained within. In the present example, address information included before the message integrity attribute corresponds to the associated public address to be provided to a called endpoint, while the address information (including IP address X) after the message integrity attribute corresponds to an on-path firewall. In other examples, the address information after the message integrity attribute may contain addresses for multiple on-path firewalls.

Next, the firewall 25 opens a pinhole to receive incoming messages from computer 2. During inactivity, the pinhole persists for the duration of any custom timeout value included in the STUN request 58A, otherwise, the pinhole persists for a default duration during inactivity.

Figure 7:
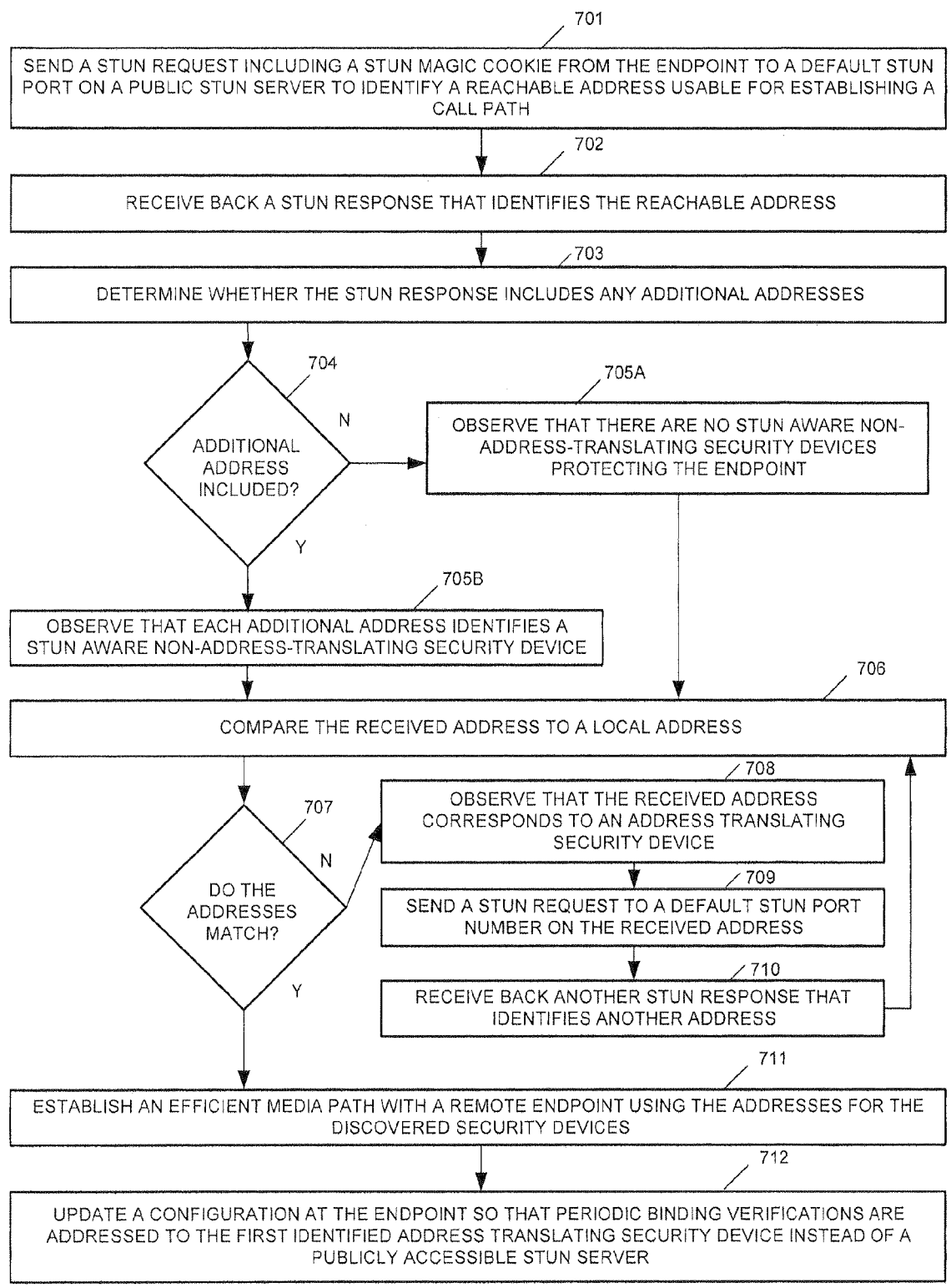
FIG. 7 illustrates an example method for using the computer illustrated in FIG. 2

FIG. 7 illustrates an example method for using the computer illustrated in FIG. 2

In block 701, the computer 21 sends a STUN request or other address request including a STUN magic cookie or other identifier to a default STUN port on a public STUN server to identify a reachable address. The computer 21 receives back a STUN response that identifies the reachable address in block 702.

In block 703, the computer 21 determines whether the STUN response includes any other addresses for other on-path security devices. When no additional addresses are included in block 704, in block 705A the computer observes that there are no STUN-aware non-address-translating devices such as firewalls protecting the computer 21. When additional addresses are included, in block 705B the computer 21 observes that each additional address identifies a STUN-aware non-address-translating device.

The computer 21 also compares the reachable address to a local address in block 706. When the addresses do not match in block 707, the computer 21 observes that the reachable address corresponds to an address translating security device located between the computer 21 and the Internet in block 708. In block 709, the computer 21 sends a STUN request to a default STUN port on the reachable address regardless of whether the address translating security device actually includes a STUN server. Optionally, the computer 21 may include an attribute requesting a custom inactivity timeout value in the STUN request sent in block 709 for reducing a required frequency for sending keepalive messages.

Next, the computer 21 receives back a STUN response that identifies another address in block 710 when the address translating security device includes a STUN server. The computer 21 then returns to block 706.

When the compared address finally matches the local address in block 707, the computer 21 has finished walking backwards through all on path network address translating security devices. In block 711, the computer 21 establishes an efficient media path with a remote endpoint using one or more of the addresses for the discovered security devices.

In block 712, the computer 21 updates a local configuration file so that future binding verifications are addressed to the observed STUN server located on one of the identified security devices instead of the public STUN server. Future STUN requests are sent to the observed STUN server rather than the public STUN server according to the configuration file.

Figure 8:
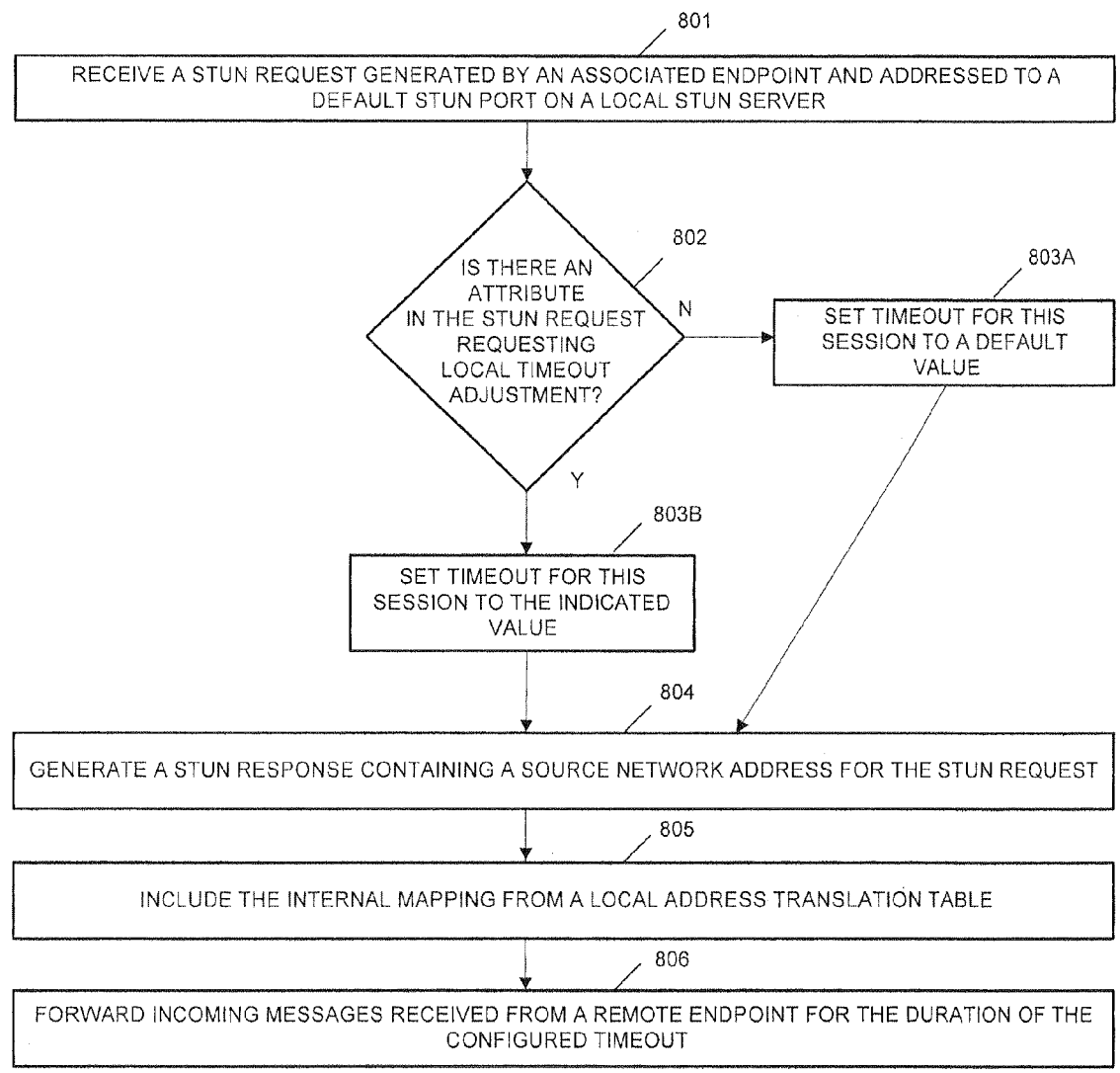
FIG. 8 illustrates an example method for using the NATs illustrated in FIG. 2.

FIG. 8 illustrates an example method for using the NATs illustrated in FIG. 2.

In block 801 the NAT 26 or 27 receives a STUN request generated by an associated endpoint and addressed to a default STUN port on a local STUN server. In block 802, the NAT 26 or 27 determines whether the STUN request includes an attribute requesting a custom inactivity timeout. When an attribute requesting a custom inactivity timeout is not included, in block 803A the NAT 26 or 27 locally sets an inactivity timeout according to a default value. When an attribute requesting a custom inactivity timeout is included, the NAT 26 or 27 locally sets an inactivity timeout according to the indicated value.

In block 804, the NAT 26 or 27 generates a STUN response containing a payload having a source network address for the STUN request. The NAT 26 or 27 may also include the internal mapping from their respect address translation table in block 805. Next, in block 806 the NAT 26 or 27 generates a binding for forwarding incoming messages from a particular remote endpoint for the duration of the configured inactivity timeout.

Figure 9:
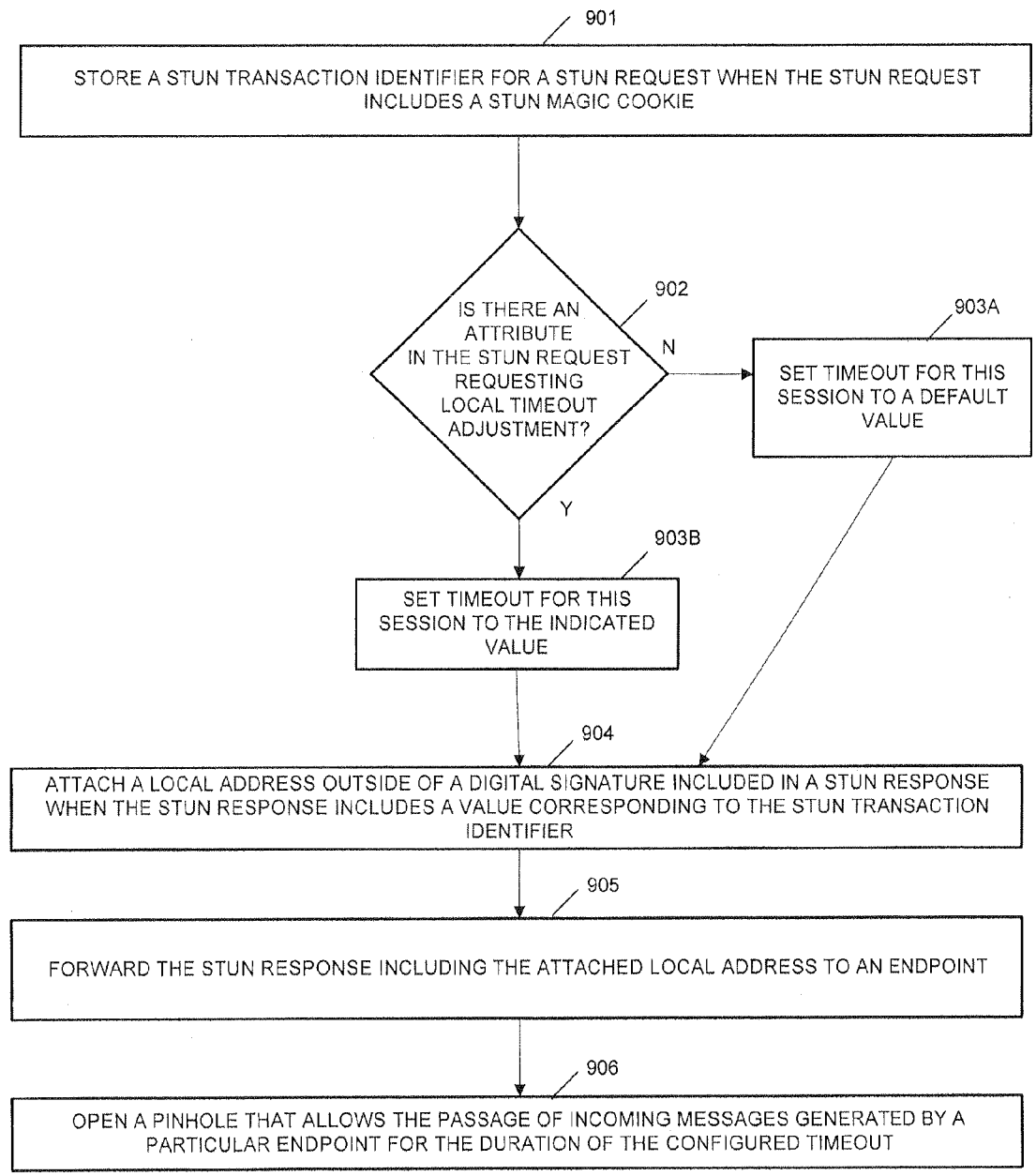
FIG. 9 illustrates an example method for using the firewall illustrated in FIG. 3.

FIG. 9 illustrates an example method for using the firewall illustrated in FIG. 3.

In block 901 the firewall 25 stores a STUN transaction identifier for a received STUN request responsive to observing a STUN magic cookie or other identifier included in the received STUN request. In block 902 the firewall 25 determines whether the STUN request includes an attribute requesting a custom inactivity timeout. When an attribute requesting a custom inactivity timeout is not included, in block 903A the firewall 25 locally sets an inactivity timeout according to a default value. When an attribute requesting a custom inactivity timeout is included, the firewall 25 locally sets an inactivity timeout according to the indicated value.

In block 904, the firewall 25 receives a STUN response and attaches a local address outside of a digital signature included in the STUN response when the STUN response includes a value corresponding to the stored STUN transaction identifier. In block 905 the firewall 25 forwards the STUN response including the attached address to an endpoint.

In block 906 the firewall 25 opens a pinhole that allows incoming messages from a particular remote endpoint to reach the associated endpoint. The pinhole is maintained for the duration of the configured inactivity timeout.

The above examples describe the identification of firewalls and NATs in different figures only for ease of explanation. It will be understood by one of ordinary skill in the art that an endpoint may be located behind any combination of firewalls and NATs, which can all be identified using a single pattern of STUN requests and responses. In other words, a single STUN request sent to an undiscovered STUN server located on a NAT may elicit a STUN response that identifies another NAT as well as one or more firewalls. Also, certain benefits that are explained with reference to the example including NATs also apply to the example including the firewall, e.g. the bandwidth savings realized by eliminating the requirement for keepalive traffic all the way to the call controller are also realized in a firewall environment.

The above examples describe a computer identifying on path security devices. In other examples, other endpoints such as a personal computer, an IP phone, a Personal Digital Assistant (PDA), a cell phone, a smart phone, a PSTN gateway, etc., may identify security devices using the methods described above.

Several preferred examples have been described above with reference to the accompanying drawings. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown are conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A method comprising:
sending a Simple Traversal of User Datagram Protocol (UDP) Through Network Address Translators (NATs) (STUN) request to a publicly accessible server that identifies publicly addressable network addresses to endpoints;
receiving back an initial response that identifies a publicly addressable network address associated with an originating source of the STUN request, wherein the initial response includes a STUN cookie that identifies the request as STUN traffic;
determining whether the initial response includes any additional addresses;
comparing the publicly addressable network address from the initial response to a local network address;
sending a new STUN request to a network address translating security device using the publicly addressable network address from the initial response if the network address thereof is different than the local network address;
receiving back a new response;
comparing, to the local network address, a network address from the new response to the newest STUN request; and
if there is no match, repeating the sending using the network address from a most recent response and said address comparison based thereon until a match is obtained.

2. The method of claim 1, wherein the initial response includes a payload containing an address for a firewall that does not perform network address translation for outgoing communications sent from the originating source.

3. The method of claim 1, wherein the initial response includes a NAT address for the network address translating security device and a source address contained in the STUN request if received by the network address translating security device.

4. The method of claim 1, wherein the STUN request includes an attribute requesting a custom timeout for a corresponding session.

5. The method of claim 1, further comprising updating a local configuration so that periodic binding verifications are addressed to the network address translating security device instead of the publicly accessible server.

6. The method of claim 1, wherein at least one of the new STUN requests is addressed to an undiscovered STUN server by a client corresponding to the local network address using the combination of the same STUN port that was used to send the initial STUN request and the publicly addressable network address.

7. A method comprising:
sending a first address request to a publicly accessible server that identifies publicly addressable network addresses to endpoints;
receiving back a first response that identifies a publicly addressable network address associated with an originating source of the first address request;
comparing the publicly addressable network address to a local network address;
sending a second address request to a network address translating security device using the publicly addressable network address if the publicly addressable network address is different than the local network address;
receiving back a Simple Traversal of User Datagram Protocol (UDP) Through Network Address Translators (NATs) (STUN) second response from the network address translating security device, wherein the STUN second response includes a different network address and a STUN cookie that identifies the request as STUN traffic;
comparing the different network address to the local network address;
sending a STUN request to a STUN server located on a different network address translating security device if the different network address does not match the local network address; and
providing the different network address to a remote network device that is reachable using the publicly addressable network address which establishes a media path that circumvents the network address translating security device.

8. A memory encoded with instructions that, responsive to being executed by a processing device, result in:
sending an address request to a publicly accessible server that identifies publicly addressable network addresses to endpoints;
receiving back an initial response that identifies a publicly addressable network address associated with an originating source of the address request, wherein the initial response includes a STUN cookie that identifies the request as STUN traffic;
determining whether the initial response includes any additional addresses;
comparing the network address from the initial response to a local network address;
sending a new address request to a network address translating security device using the network address from the initial response if the network address thereof is different than the local network address;
receiving back a new response;
comparing, to the local network address, a network address from the new response to the newest address request; and
if there is no match, repeating the sending using the network address from a most recent response and said address comparison based thereon until a match is obtained.

9. The memory of claim 8, wherein the instructions, responsive to being executed by the processing device, result in:
addressing at least one of the new address requests to an undiscovered Simple Traversal of User Datagram Protocol (UDP) Through Network Address Translators (NATs) (STUN) server using combination of a STUN port that was used to send the initial address request and the publicly addressable network address.

10. The memory of claim 8, wherein the instructions, responsive to being executed by the processing device, result in:
providing the publicly addressable network address to a remote network device that is reachable using the publicly addressable network address to establish a media path that circumvents the network address translating security device.

11. The memory of claim 8, wherein the initial address request includes an attribute requesting a custom timeout for a corresponding session.

12. The memory of claim 8, wherein the instructions, responsive to being executed by the processing device, result in:
updating a local configuration so that periodic binding verifications are addressed to the network address translating security device instead of the publicly accessible server.

* * * * *